United States Patent [19]

Ettridge

[11] 4,411,473

[45] Oct. 25, 1983

[54] WEBBING HARNESS RESTRAINTS

[76] Inventor: John P. Ettridge, 235 Diagonal Rd., Warradale, Australia, 5046

[21] Appl. No.: 227,084

[22] PCT Filed: Apr. 24, 1980

[86] PCT No.: PCT/AU80/00005
§ 371 Date: Dec. 26, 1980
§ 102(e) Date: Dec. 17, 1980

[87] PCT Pub. No.: WO80/02379
PCT Pub. Date: Nov. 13, 1980

[30] Foreign Application Priority Data

Apr. 9, 1979 [AU] Australia ................ PD8329

[51] Int. Cl.³ .................. B60R 21/10; A47D 13/08
[52] U.S. Cl. ................... 297/484; 297/216; 297/467
[58] Field of Search ......... 297/467, 484, 468, 216, 297/484; 280/801, 808; 244/122 B

[56] References Cited

U.S. PATENT DOCUMENTS

| 1,891,418 | 12/1932 | Hoffman | 244/122 B |
| 2,192,109 | 2/1940 | Smith | 244/122 B |
| 2,856,991 | 10/1958 | Princiotta | 297/484 |
| 3,178,223 | 4/1965 | Martin | 297/467 |
| 3,604,750 | 9/1971 | Doering | 297/467 |
| 3,912,328 | 10/1975 | Tanaka | 297/484 |
| 3,934,934 | 1/1976 | Farrell, Jr. et al. | 297/467 |
| 4,186,962 | 2/1980 | Meeker | 297/467 |
| 4,190,287 | 2/1980 | Lemisch et al. | 297/467 |
| 4,289,352 | 9/1981 | Ashworth | 297/483 X |

FOREIGN PATENT DOCUMENTS

| 60010 | 12/1966 | Australia . | |
| 23568 | 9/1978 | Australia . | |
| 2361918 | 3/1978 | France . | |
| 391475 | 9/1965 | Switzerland . | |
| 1034567 | 6/1966 | United Kingdom | 244/122 B |

Primary Examiner—James T. McCall
Attorney, Agent, or Firm—Oldham, Oldham, Hudak, Weber & Sand

[57] ABSTRACT

A harness restraint for a person seated in a seat (1) having a seat position (2) and a back rest portion (3). The restraint is a pair of shoulder straps (6) each being anchored at its respective upper ends (7) and each extend downwards in parallel relationship to the junction of the seat portion (2) and back rest portion (3) then in a horizontal direction to the sides of the seat to form a lap sash in the relaxed state. A crotch strap (9) anchored at one end to fixture (10) has its free end passed between the legs of the person seated and looped around the shoulder straps then back to be releasably secured by buckle (11) to fixture (10). Inertia reel devices may be provided at the anchoring ends of the belts.

5 Claims, 3 Drawing Figures

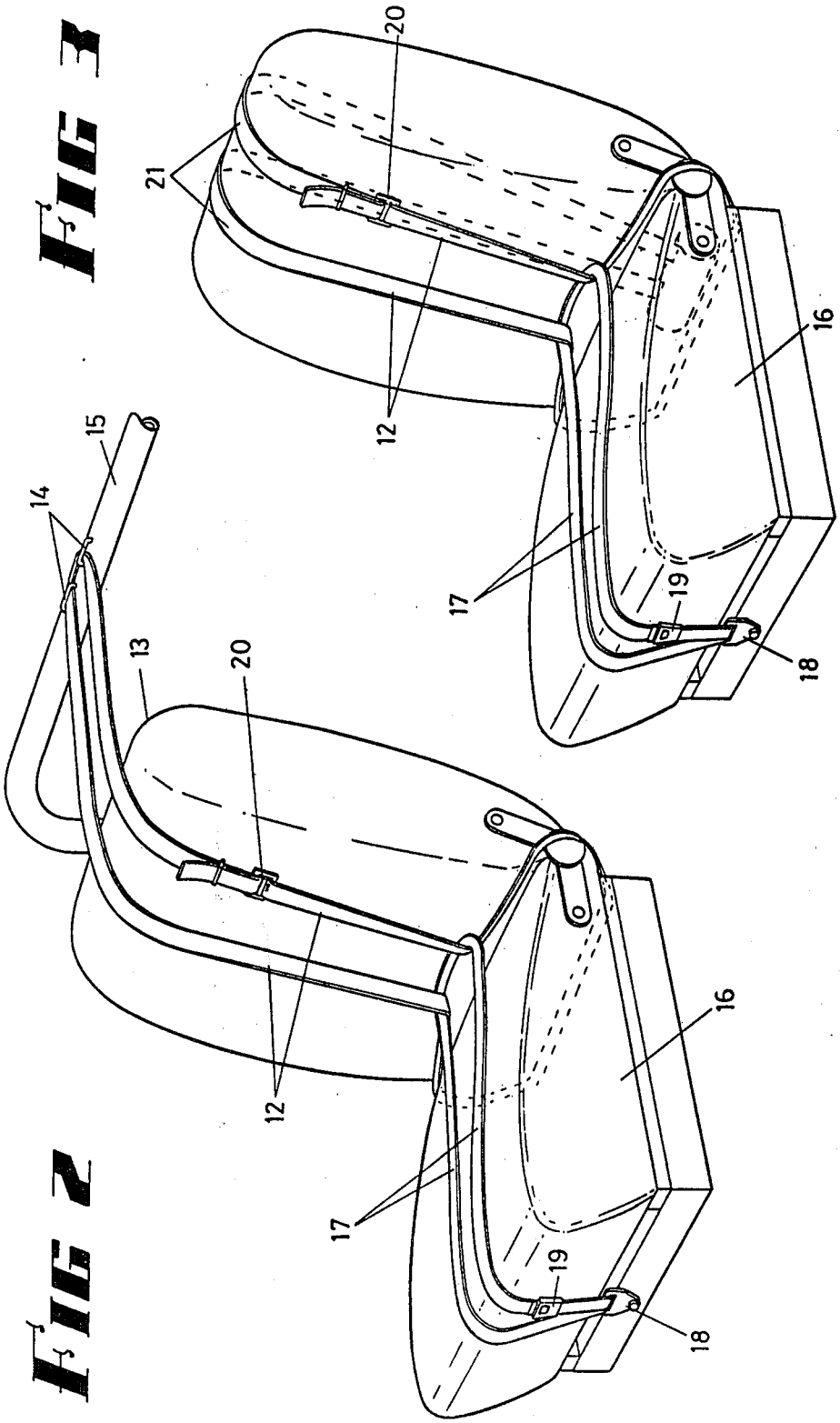

WEBBING HARNESS RESTRAINTS

This invention relates to an improved webbing harness restraint, particularly for use by adults and children, particularly in motor vehicles, aircraft, marine craft, militry vehicles and other transport vehicles.

BACKGROUND OF THE INVENTION

Harness restraints in motor vehicles are usually of the lap type, lap and sash type, or full harness. The lap type, and lap and sash type are not ideal, for the belts do not fully restrain the person, and the full harness type includes a number of buckles and release mechanisms.

It is known that in a safety harness, one of the weak points is the provision of joins, and the provision of buckles on the end or ends of the various straps. Thus in a full harness various seams and joins are required where buckles are fitted.

It is an object of this invention to provide a harness restraint which provides a full harness restraint on a wearer.

It is a further object to provide a harness restraint in which a minimum of belts or straps are used with a corresponding minimum of joins and buckles.

It is a still further object to provide a harness restraint in which the straps are easily fitted to the user, and which can be easily unlatched or unbuckled.

BRIEF STATEMENT OF INVENTION

According to this invention there is provided a harness restraint for a person in a seat, the restraint comprising a pair of shoulder straps each anchored through the rear of the seat portion, and a crotch strap passing around each shoulder strap to draw these together in the area of the crotch to have a lap belt effect.

BRIEF DESCRIPTION OF THE DRAWINGS

FIG. 2 shows the invention applied to a vehicle seat, and

FIG. 3 shows a further embodiment.

DESCRIPTION OF THE PREFERRED EMBODIMENT

Figure 1:
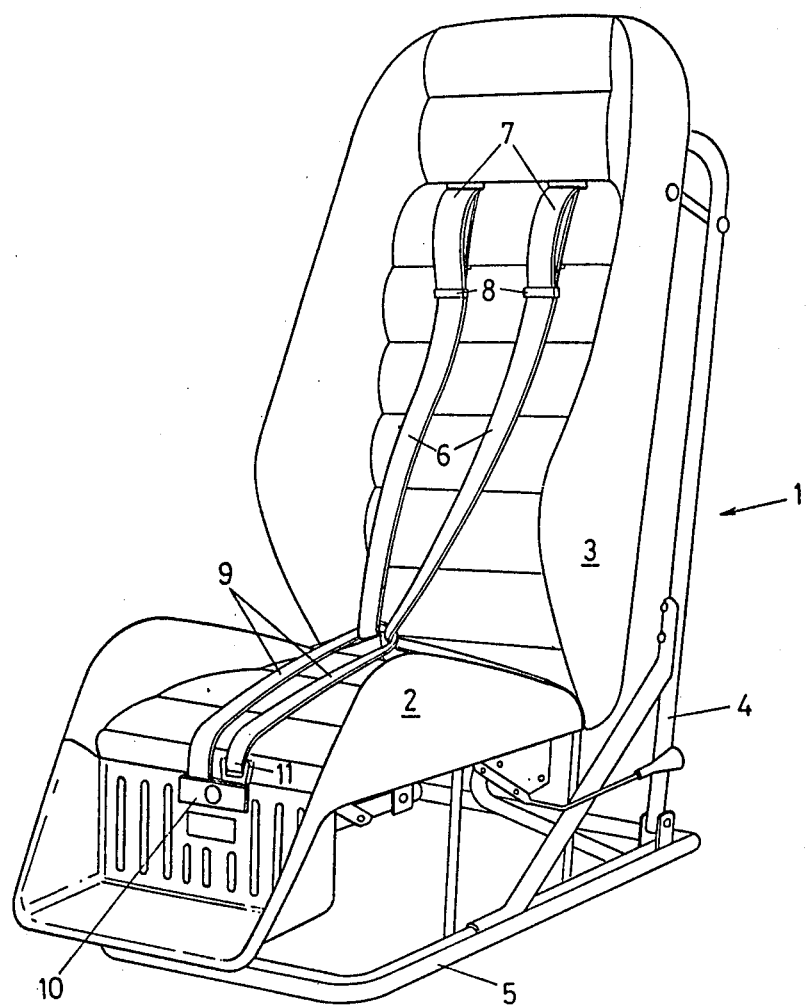
FIG. 1 shows the invention applied to a childs car seat.

Referring firstly to FIG. 1, the invention is applied to a childs car seat 1, having a seat portion 2 and a back portion 3 mounted on a back frame 4 and base 5. The childs seat 1 is adapted to be secured in position on a vehicle seat by seat belts (not shown) fitted to the vehicle.

In this embodiment the shoulder straps 6 are adjustably attached at their ends 7 to the upper end of the seat back 3 at a position above the childs shoulders, the straps being provided with adjustment devices 8. Each strap 6 then passes downwardly through between the seat 2 and back portion 3 on the same side as its attachment at the top of the back portion 3, and are securely located to a fixed member on the seat 1. Each strap 6 can be joined to the fixed member, or alternatively the two straps 6 can be formed from a single strap passing around and through an anchorage on the seat 1. In this way, the straps 6 are a single length of belting and located by adjustment devices on the upper end of the seat back 3.

The crotch or leg strap 9 is attached to the seat portion 2 by a fixture 10 and a buckle 11. The strap 9 passes up between the legs around the shoulder strap 6 so that the straps 6 and both legs of strap 9 are looped together at about the crotch area of the child. In this way the straps 6 pass from the shoulder down to the crotch area and then over the hips to the anchorage. In this way the child is securely held in the seat, the straps over the shoulders preventing bodily movement forward about the hips, and the crotch strap 9 and straps 6 prevent the body sliding down along the seat.

To fit the restraint, the child is seated, the straps 6 are then placed over the shoulders and then the crotch strap 9 is passed through behind both straps 6 and then fastened by its buckle 11. Hence one buckle only is used to fully restrain the child in the restraint.

An alternative version to be used by adults is shown as FIG. 2 where the restraint is fitted to a vehicle. In this example the shoulder straps 12 are formed of a single strap passing from the back 13 of the seat to anchorage points 14 on a fixture of the vehicle, such as a roll bar 15. The strap 12 passes downwardly to the floor from the seat 16 and around anchorage loops 17. The strap 12 is adjusted by adjustment 20. The crotch strap passes from an anchorage 18, up between the legs to pass around the straps 12 and back to the buckle 19. Referring to FIG. 3, this shows a further example where the shoulder straps 21 again being formed from a single strap, pass downwardly to an inertia reel device securely attached to the floor of the vehicle. This allows automatic adjustment of the straps 21 and allows the wearer to slowly lean and move forwardly as and when required.

In a further alternative the crotch strap 12 could also be provided with an inertia reel device if desired, and the shoulder straps could be anchored at the roll bar, and the other ends of the straps, after passing through between the seat and back, be provided with an inertia reel device in this area.

It will be seen by the invention that one buckle or latch only is required on one belt, to release and fasten the full harness type of restraint for passenger vehicles.

It will be realized that there is a minimum of joins and a minimum of buckles being fitted to the various straps, and where these straps are anchored by an adjustment device, these are more securely held than a fixed anchorage in which a latch or hook has to be sewn on to the belt.

Although various forms of the invention have been described, it is to be realized that the invention is not limited to these, but may include variations falling within the spirit and scope of the invention.

The claims defining the invention are as follows.

I claim:

1. A harness restraint for a person in a seat having a seat portion and a back rest portion, said restraint comprising a pair of shoulder straps, each strap being anchored at its respective upper end above and behind the lower end to enter at the junction of the seat portion and back rest portion generally in parallel relationship in the relaxed state, and a crotch strap anchored at both ends at the front of the seat adapted to pass up between the legs of the person, around both shoulder straps to draw these together in the area of the crotch, and a single releasable catch on the crotch strap positioned between the legs of the person whereby this single catch controls the release and attachment of the harness.

2. A harness restraint for a person as defined in claim 1, characterized in that the seat is a childs car seat and the shoulder straps are adjustably anchored with the top of the back rest portion above each respective shoulder of the child, passes between the seat portion and back rest portion to be anchored to a frame of the seat.

3. A harness restraint as defined in claim 7 and characterized in that the shoulder straps are portions of a single strap passing around an upper anchorage point behind the seat and a lower anchorage point below the seat, a single strap having its ends adjustably joined together.

4. A harness restraint as defined in claim 3 characterized in that the single strap for holding the shoulder strap passes downwardly from the top of the back rest portion to the lower anchorage comprised of an inertia reel device.

5. A harness restraint as defined in any one of claims 7 characterized in that the crotch strap is anchored between the legs of the person and passes upwardly around both shoulder straps, and is fastened by a releasable buckle to either the end of the strap or to an anchorage whereby the single releasable buckle allows the harness to be released and positioned.

* * * * *